United States Patent [19]

Pickens et al.

[11] Patent Number: 5,030,403

[45] Date of Patent: Jul. 9, 1991

[54] METHOD FOR MAKING POLYMERIC FIBRILS

[75] Inventors: Stanley R. Pickens, Monroeville; Donald W. DuBois, Irwin, both of Pa.; Hou-Ching M. Yang, Bedford, Mass.

[73] Assignee: PPG Industries, Inc., Pittsburgh, Pa.

[21] Appl. No.: 492,274

[22] Filed: Mar. 7, 1990

Related U.S. Application Data

[63] Continuation of Ser. No. 297,158, Jan. 17, 1989, abandoned.

[51] Int. Cl.[5] .............................................. B29B 9/02
[52] U.S. Cl. .................................... 264/140; 264/127; 264/DIG. 47
[58] Field of Search ................... 264/127, 120, 12, 13, 264/104, 320, 325, DIG. 47, 349, 140–141; 425/6, 382.2, 382.4

[56] References Cited

U.S. PATENT DOCUMENTS

| | | | |
|---|---|---|---|
| 3,081,519 | 3/1963 | Blades et al. | 264/DIG. 47 |
| 3,513,144 | 5/1970 | Kometani et al. | 264/127 |
| 3,756,441 | 9/1973 | Anderson et al. | 264/205 |
| 3,890,417 | 6/1975 | Vallance | 264/127 |
| 4,081,226 | 3/1978 | Pleska et al. | 425/382.2 |
| 4,125,584 | 11/1978 | Boehme et al. | 264/DIG. 47 |
| 4,150,076 | 4/1979 | Baris et al. | 264/127 |
| 4,183,881 | 1/1980 | Griffin et al. | 425/146 |
| 4,289,600 | 9/1981 | Lazarz et al. | 264/127 |
| 4,380,521 | 4/1983 | Morano et al. | 264/127 |

Primary Examiner—Jeffery Thurlow
Attorney, Agent, or Firm—Edward J. Whitfield; Irwin M. Stein

[57] ABSTRACT

This invention relates to a method of making thermoplastic polymeric fibrils by passing an aqueous suspension of powdered thermoplastic polymeric material at high pressure through a two-stage valve assembly of the type conventionally used in liquid homogenization.

14 Claims, 1 Drawing Sheet

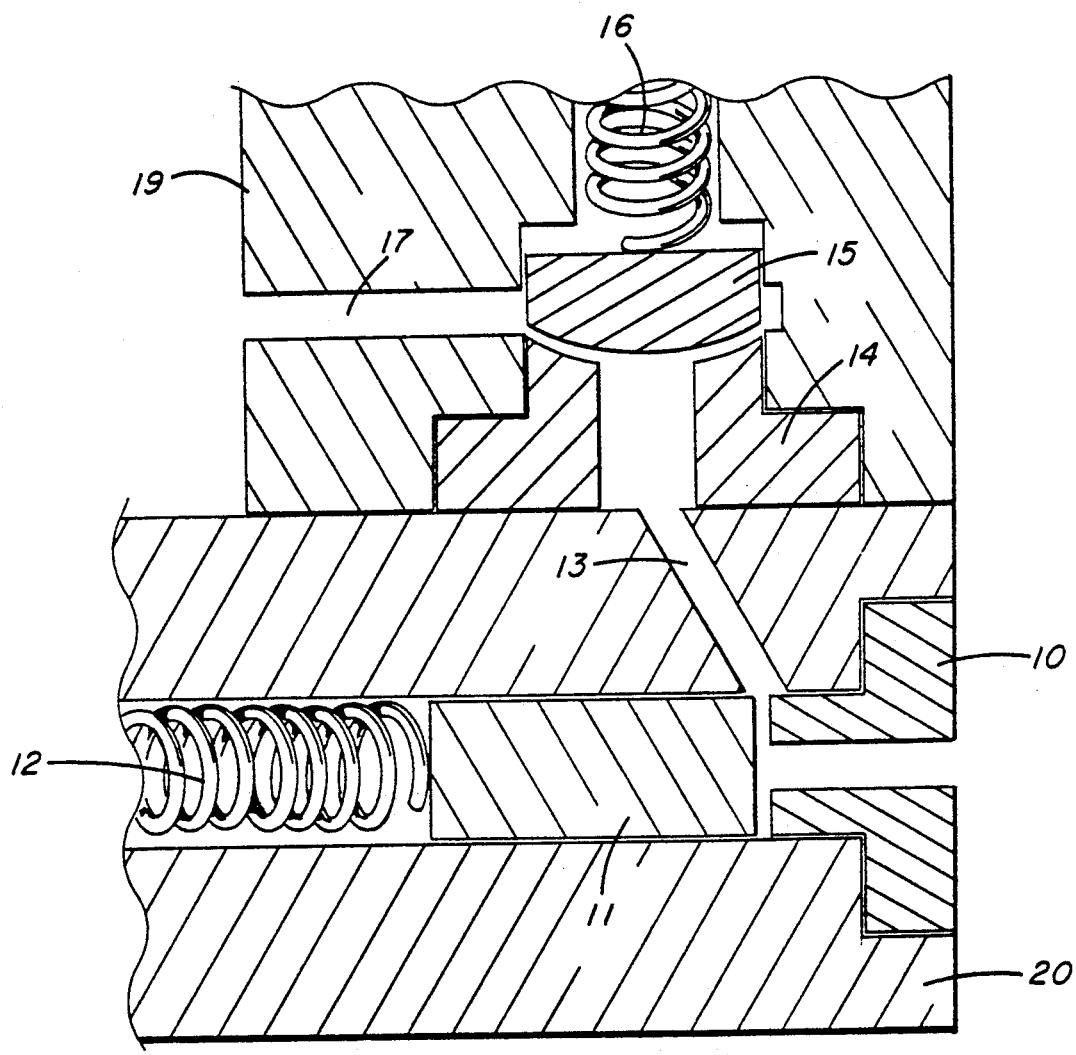

METHOD FOR MAKING POLYMERIC FIBRILS

This application is a continuation of application Ser. No. 07/297,158, filed Jan. 17, 1989, now abandoned

BACKGROUND OF THE INVENTION

Fibrils of thermoplastic polymeric material may be prepared by flash spinning processes wherein an organic solvent solution, dispersion, emulsion or suspension of polymeric material in a fluid medium is extruded through an orifice under conditions of temperature and pressure wherein the liquid medium is rapidly vaporized or evaporated resulting in formation of polymeric fibrils. See, e.g., U.S. Pat. No. 4,211,737 wherein an organic solvent solution, dispersion or emulsion of fiber-forming polymeric material is extruded through a convergent-divergent DeLaval type nozzle.

Alternatively, U.S. Pat. No. 4,219,512 discloses a polymeric fibril making process wherein an organic solvent solution of polymeric material is introduced into a fluid precipitation medium under the action of mechanically generated shearing forces.

In accordance with the present invention, thermoplastic fibrils may be readily and conveniently made from an aqueous suspension of powdered thermoplastic polymeric material and especially an aqueous suspension of powdered polytetrafluoroethylene (PTFE).

THE INVENTION

In accordance with this invention, thermoplastic polymeric fibrils may be prepared by passing an aqueous suspension of thermoplastic polymeric powder through a two-stage valve assembly of the type conventionally used in liquid homogenization.

BRIEF DESCRIPTION OF THE DRAWING

The accompanying drawing schematically illustrates a plan view of a conventional two-stage homogenizing valve assembly, preferably used in the practice of this invention.

In the drawing, the flow path of the aqueous suspension of PTFE powder is indicated by the arrows. By means of a positive displacement pump (not shown), PTFE suspension is conveyed from a storage tank (not shown) and enters valve seat 10, disposed in housing 20, at a relatively low velocity but at a high pressure. The pressure is generated both by the pump and the flow restriction caused by urging valve 11 toward seat 10 by means of spring 12. The tension on spring 12 is adjusted by means of a threaded hand wheel (not shown) on the remote end of spring 12. Increasing or decreasing the tension on spring 12 by turning the hand wheel increases or decreases the distance between valve 11 and seat 10 thus increasing or decreasing the pressure drop across the valve.

The PTFE suspension passes through the narrow gap between valve 11 and seat 10 at a relatively high velocity and exits through conduit 13 and passes through the narrow gap between valve seat 14 and associated valve 15 disposed in housing 19 at a right angle to seat 10 and valve 11. The pressure drop across valve 15 is regulated by spring 16 in like manner as described with reference to valve 11. The suspension containing PTFE fibrils is discharged via conduit 17. Conversion of the suspension of PTFE powder to a suspension of PTFE fibrils is effected by forced passage at high pressure through the narrow gaps between each of valves 11 and 15 and associated seats 10 and 14.

It has been observed that conversion of PTFE powder to PTFE fibrils is a function of pressure, i.e., the higher the pressure drop across the valves, the more complete the conversion from powder to fibrils. In practice, total pressure drop in the range of from at least about 6,000 to about 12,000 psig should provide satisfactory results. Although the pressure drop across each valve may vary, the pressure drop across any one valve should not be less than about 2000 psig. In a preferred embodiment, the pressure drop across each valve is substantially the same. Homogenization apparatus embodying the two-stage valve described hereinabove with reference to the drawing is commercially available, from, e.g., APV Gaulin, Inc.

The PTFE powder preferably used in accordance with this invention has an average ultimate particle size of about 0.1 micron and the fibrils produced therefrom range from about 5 to about 100 microns in diameter with a length of about 0.1 to 3 millimeters. Most commonly the fibrils produced by the process of this invention range from about 10 to 15 microns in diameter with a length of from about 0.2 to 0.5 millimeters.

Microscopic examination of the PTFE fibrils produced by the process of this invention indicated that in general they have a ribbon-like form, but they also exhibit a range of morphologies from sheet-like films to cylindrical fibrils. The highly wrinkled and knotted fiber-like and sheet like structures associated with the predominantly ribbon-like fibrils appear to form a cohesive, entangled network. However, no highly branched or tree-like forms are observed. Some fibrils have been observed which exhibit partial splitting into two or more smaller fibrils oriented parallel to the long axis of the coarser fiber.

The PTFE fibrils produced by the process of this invention are useful as fillers and reinforcing agents, and as additives in papermaking pulps. They have been found to be particularly useful as a constituent in the fabrication of synthetic, i.e. non-asbestos liquid permeable diaphragms comprising fibrous polymeric material for use in electrolytic cells for the manufacture of chlorine and alkali metal hydroxide, such diaphragms being described, e.g., in U.S. Pat. No. 4,720,334.

The invention is further illustrated but it is not to be limited by the following Examples.

EXAMPLE I

Preparation of PTFE fibrils according to the invention:

To a 4-liter beaker were added 2648 grams of water, 30.0 grams of AVANEL ® N-925 non-ionic surfactant (product of PPG Industries, Inc.), 6.0 grams of UCON ® LO-500 antifoamant (product of Union Carbide Corp.), 1.2 grams of Ucarcide TM 250 antimicrobial (product of Union Carbide Corp.), 13.2 grams of Cellosize TM QP-52000H hydroxyethyl cellulose (product of Union Carbide Corp.), 1.5 milliliters of 1 normal sodium hydroxide solution and 300 grams of TEFLON ® 60 powdered PTFE (product of E. I. duPont de Nemours & Co.). The mixture was stirred for 20 minutes with a Greerco model 1L laboratory homogenizer/vortex mixer operating at a powerstat setting of 70%. After standing several days the settled PTFE powder was resuspended by vigorous shaking and the resulting suspension was processed through an APV Gaulin, Inc. model 15M laboratory homogenizer provided with a two-stage homogenizing valve as described with reference to the drawing. The suspension was pumped through the homogenizer at a total pressure drop of 8000 psig substantially equally divided between the two homogenizer valves. After passing through the homogenizer the PTFE powder in the suspension was largely converted to fibrils ranging from 5 to 100 microns in diameter and from 0.1 to 3 millimeters in length. The bulk of the PTFE fibrils had a diameter in the range of 10 to 15 microns and a length in the range of 0.2 to 0.5 millimeter.

EXAMPLE II

Preparation of a non-asbestos, fibrous polytetrafluoroethylene (PTFE) diaphragm:

To 1400 grams of deionized water were added 16.03 grams of PPG Industries, Inc. AVANEL® N-925 non-ionic surfactant, 3.6 grams of Union Carbide UCON® LO-500 antifoamant, and 1.28 grams of Union Carbide Ucarcide TM 250 antimicrobial. This mixture was stirred by means of a Greerco model 1L laboratory homogenizer/vortex mixer operating at a powerstat setting of 50%. To the stirring mixture were added 7.11 grams of Union Carbide Cellosize TM QP-52000H hydroxyethyl cellulose and 1.20 grams of 1 normal sodium hydroxide solution. After 10 minutes the powerstat setting for the mixer was increased to 70% and 6.84 grams of 0.635 centimeter by 6.6 denier PTFE fibers were added. After 3 minutes 4.41 grams of HazMat TM polypropylene fiber (from New Pig Corp.) were added. After another 2 minutes 197 grams of the aqueous suspension containing about 10 wt-% PTFE fibrils, prepared as descried in Example I, were added. After another 4 minutes 5.63 grams of 5% 1100 EW Nafion Solution (from Solution Technology, Inc.) were added. After another 3 minutes the mixer was turned off and the slurry was diluted to a total weight of 1800 grams with deionized water.

A diaphragm was deposited from the above slurry by drawing the slurry through a cathode screen made of 6 mesh mild steel wire cloth at a gradually accelerating rate going from 0 to 1.64 mL/cm$^2$-min in about 13 minutes, the pressure drop across the forming diaphragm gradually increasing to a maximum of 460 torr. After 8.86 mL of slurry per cm$^2$ of cathode screen had been filtered, the diaphragm was dried by pulling air through it (with a 460 torr pressure differential) for 10 minutes followed by baking at 117° C. for a half hour. The dry diaphragm weighed 14 grams/dm$^2$.

The diaphragm/cathode assembly was assembled into a laboratory chlor-alkali cell with an expanded metal mesh anode spaced 5.5 mm from the cathode. The cell was filled with brine (ca. 24.5 wt % NaCl), heated to 90° C., and operated at 14.3 amperes/dm$^2$. After 26 days of operation, the cell was consistently operating at about 3.05 volts, about 90% current efficiency and about 2330 kWH/Unit NaOH power consumption.

Although the invention has been described by the foregoing with reference to preparing preferred polymeric fibrils, i.e., PTFE fibrils, from an aqueous suspension of PTFE powder, the method of the invention is believed applicable and adaptable to preparing fibrils from powdered thermoplastic materials known to the art. Also, although a preferred use of the fibrils prepared according to the process of this invention has been illustrated, i.e., preparation of a synthetic porous diaphragm for use in electrolytic chlor-alkali cells, it is to be understood that the fibrils can be used for any other purpose for which such fibrils are typically used, e.g., as fillers or reinforcing agents in shaped polymeric structures as described, e.g., in U.S. Pat. No. 4,385,019 or as components in paper-making pulps. It is to be further understood that the fibrils may be separated from the aqueous suspension in which they are contained by any suitable means, e.g., by filtration or centrifugation or by evaporation of the aqueous medium.

We claim:

1. A method of making polytetrafluoroethylene fibrils, comprising charging an aqueous suspension of polytetrafluoroethylene powder into a two-stage liquid homogenizing valve, passing the aqueous suspension in sequence at high pressure through each of the two valve seats of the two-stage homogenizing valve, and withdrawing from the valve a suspension of polytetrafluoroethylene fibrils, the pressure drop across each of the valve seats being not less than 2000 psig.

2. The method of claim 1 wherein the total pressure drop across the homogenizing valve ranges from about 6000 to about 12000 psig.

3. The method of claim 2 wherein the pressure drop across each valve seat of the two-stage homogenizing valve is substantially the same.

4. The method of claim 1 wherein the polytetrafluoroethylene fibrils are of a diameter ranging from about 5 to about 100 microns with a length of from about 0.1 to 3 millimeters.

5. The method of claim 3 wherein the polytetrafluoroethylene fibrils are of a diameter ranging from about 10 to 15 microns with a length of from about 0.2 to 0.5 millimeters.

6. A method of making fibrils of thermoplastic polymeric material, comprising charging an aqueous suspension of powdered thermoplastic polymeric material into a two-stage liquid homogenizing valve, passing the aqueous suspension in sequence at high pressure through each of the two valve seats of the two-stage homogenizing valve, the pressure drop across each of the valve seats being not less than 2000 psig., and withdrawing from the valve a suspension of fibrils of said thermoplastic polymeric material, said fibrils having a diameter ranging from about 5 to about 100 microns with a length of from about 0.1 to 3 millimeters.

7. The method of claim 6 wherein the total pressure drop across the homogenizing valve ranges from about 6000 to about 12000 psig.

8. The method of claim 7 wherein the pressure drop across each valve seat of the two-stage homogenizing valve is substantially the same.

9. The method of claim 8 wherein the fibrils are of a diameter ranging from about 10 to 15 microns with a length of from about 0.2 to 0.5 millimeters.

10. The method of claim 6 wherein the polymeric material is polytetrafluoroethylene.

11. A method of making polytetrafluoroethylene fibrils comprising charging an aqueous suspension of polytetrafluoroethylene powder into a staged liquid homogenizing valve, passing the aqueous suspension in sequence at high pressure through each of the valve seats of the homogenizing valve, and withdrawing from the valve a suspension of polytetrafluoroethylene fibrils having a diameter ranging from 5 to about 100 microns with a length of from about 0.1 to 3 millimeters, the pressure drop across each of the valve seats being not less than 2000 psig.

12. The method of claim 11 wherein the total pressure drop across the homogenizing valve ranges from about 6000 to about 12000 psig.

13. The method of claim 12 wherein the pressure drop across each of the valve seats is substantially the same.

14. The method of claim 18 wherein the polytetrafluoroethylene fibrils are of a diameter ranging from about 10 to 15 microns with a length of from about 0.2 to 0.5 millimeters.

* * * * *